(12) United States Patent
Shoji et al.

(10) Patent No.: US 8,749,954 B2
(45) Date of Patent: Jun. 10, 2014

(54) ELECTRODE FOIL AND CAPACITOR USING SAME

(75) Inventors: Masashi Shoji, Kyoto (JP); Hitoshi Ishimoto, Hyogo (JP); Ayumi Kochi, Osaka (JP); Tomohiro Maruoka, Kyoto (JP); Naomi Kurihara, Osaka (JP); Takao Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 121 days.

(21) Appl. No.: 13/500,096

(22) PCT Filed: Oct. 19, 2010

(86) PCT No.: PCT/JP2010/006174
§ 371 (c)(1),
(2), (4) Date: Apr. 4, 2012

(87) PCT Pub. No.: WO2011/052156
PCT Pub. Date: May 5, 2011

(65) Prior Publication Data
US 2012/0200985 A1   Aug. 9, 2012

(30) Foreign Application Priority Data
Oct. 30, 2009  (JP) ................... 2009-249769

(51) Int. Cl.
*H01G 9/04* (2006.01)
*H01G 9/145* (2006.01)

(52) U.S. Cl.
USPC ........... 361/528; 361/523; 361/502; 361/508; 361/509

(58) Field of Classification Search
USPC ......... 361/502, 503, 509, 511, 523, 528, 529, 361/530
See application file for complete search history.

(56) References Cited

U.S. PATENT DOCUMENTS 6,876,541 B1 * 4/2005 Kato et al. .................... 361/523
2007/0002525 A1    1/2007 Yamanoi et al.

FOREIGN PATENT DOCUMENTS

| CN | 1868011 | 11/2006 | |
|---|---|---|---|
| CN | 101292309 | 10/2008 | |
| FR | 2538614 A1 * | 6/1984 | ............ H01J 41/12 |
| JP | 60-66806 | 4/1985 | |
| JP | 01-124212 | 5/1989 | |
| JP | 01-290217 | 11/1989 | |
| JP | 03-276619 | 12/1991 | |
| JP | 03-276620 | 12/1991 | |
| JP | 04-062822 | 2/1992 | |
| JP | 06-264201 | 9/1994 | |

(Continued)

OTHER PUBLICATIONS

Li, Dongmei, et al., Improvement in Power Durability of Al Electrode Films Used in SAW Devices by Zr Additive and Ti Underlayer, 2008, Journal of Electronic Materials, vol. 37, No. 2, pp. 180-184.*

(Continued)

*Primary Examiner* — Jayprakash N Gandhi
*Assistant Examiner* — Dion Ferguson
(74) *Attorney, Agent, or Firm* — Wenderoth, Lind & Ponack, LLP.

(57) ABSTRACT

Electrode foil includes an aluminum alloy having a composition in a region at least 10 μm deep from a surface of the foil. The composition includes aluminum as a main component and zirconium of at least 0.03 at % and at most 0.5 at %.

13 Claims, 4 Drawing Sheets

(56) References Cited

FOREIGN PATENT DOCUMENTS

| | | | | |
|---|---|---|---|---|
| JP | 06-267803 | 9/1994 | | |
| JP | 06-333786 A | 12/1994 | | |
| JP | 07321330 A | * 12/1995 | ............ | H01L 29/786 |
| JP | 08-130163 | 5/1996 | | |
| JP | 09-266141 | 10/1997 | | |
| JP | 2000-012402 | 1/2000 | | |
| WO | 2007/055121 | 5/2007 | | |

OTHER PUBLICATIONS

International Search Report issued Jan. 18, 2011 in International (PCT) Application No. PCT/JP2010/006174.

* cited by examiner

1
ELECTRODE FOIL AND CAPACITOR USING SAME

TECHNICAL FIELD

The present invention relates to electrode foil and a capacitor using the same.

BACKGROUND ART

Examples of capacitors include a solid electrolytic capacitor having low ESR (equivalent series resistance) used in a periphery of a CPU (central processing unit) of a personal computer, an aluminum electrolytic capacitor used for smoothing a power supply circuit, and the like. These capacitors have been strongly demanded to have a smaller size and larger capacity.

For example, a solid electrolytic capacitor includes electrode foil (anode foil) having an oxide film formed on the surface thereof, a solid electrolyte layer made of a conductive polymer and formed on the oxide film, and a cathode current collector formed on the solid electrolyte layer. The solid electrolyte layer and the cathode current collector form a cathode layer.

Electrode foil can be obtained by etching metal foil such as aluminum foil. Thus, the surface area of the electrode foil can be increased and the capacitance can be enhanced.

However, there is a technical limit to making finer by etching. Therefore, recently, use of aluminum alloy foil, which contains different metal in aluminum, as metal foil has been studied. Furthermore, it is also studied to enhance the dielectric constant of an oxide film and to increase capacity by changing a composition of metal foil itself by using aluminum alloy foil.

Examples of the above-mentioned aluminum alloy foil include aluminum-zirconium alloy foil containing zirconium in aluminum. It is thought that, because the dielectric constant of an oxide of zirconium is high, use of the aluminum-zirconium alloy foil enhances the dielectric constant of an oxide film and thus contributes to improve the capacitance.

In this way, conventionally, in the electrode foil made of the aluminum-zirconium alloy, the atomic ratio of zirconium is increased so as to enhance the dielectric constant of the oxide film and thereby to enhance the capacitance.

However, in conventional electrode foil made of the aluminum-zirconium alloy, as the atomic ratio of zirconium is increased, the capacitance is rather reduced even if etching processing is carried out.

This is because zirconium cannot be sufficiently dispersed in aluminum, and zirconium reacts with aluminum to precipitate as an intermetallic compound in electrode foil. When the electrode foil is etched, the intermetallic compound is not etched and remains in a state in which it is exposed on the surface of the electrode foil. As a result, the surface area of the electrode foil cannot be sufficiently enlarged, resulting in lowering the capacitance (see, for example, Japanese Patent Application Unexamined Publication No. S60-66806).

SUMMARY OF THE INVENTION

In view of the above-mentioned problem, the present invention improves capacitance of electrode foil.

Electrode foil includes an aluminum alloy having a composition in a region at least 10 μm deep from a surface of the foil. The composition includes aluminum as a main component and zirconium of at least 0.03 at % and at most 0.5 at %.

DESCRIPTION OF EMBODIMENTS

First Exemplary Embodiment

Electrode foil in accordance with a first exemplary embodiment of the present invention and a capacitor using the electrode foil are described with reference to drawings. The capacitor of this exemplary embodiment is a solid electrolytic capacitor using a conductive polymer material as an electrolyte.

Figure 1:
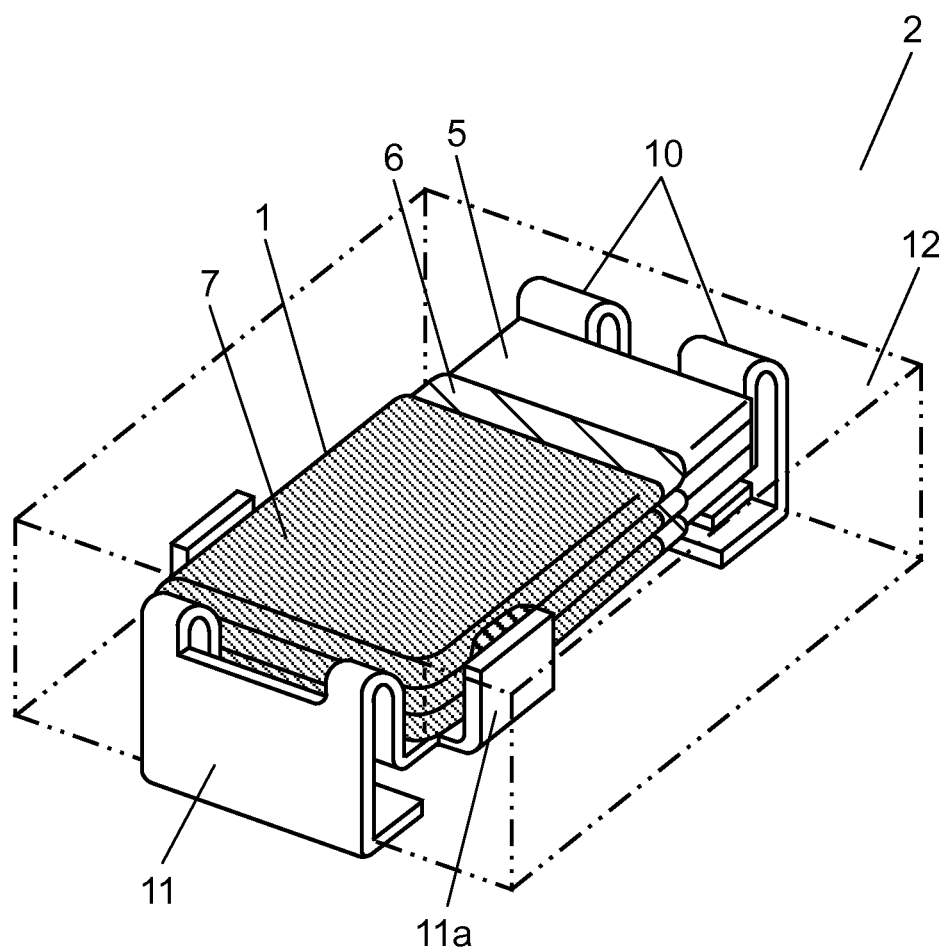
FIG. 1 is a perspective view of a capacitor in accordance with a first exemplary embodiment of the present invention.
Figure 2A:
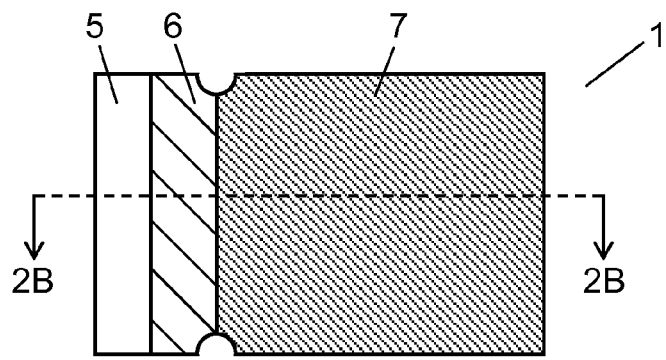
FIG. 2A is a plan view of a capacitor element used in the capacitor in accordance with the first exemplary embodiment of the present invention.
Figure 2B:
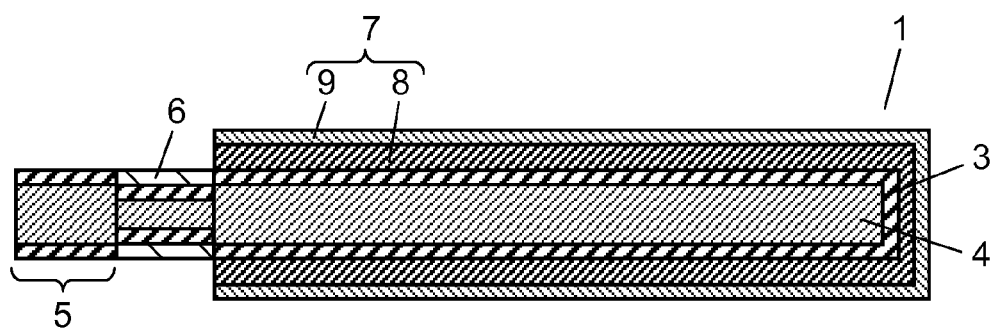
FIG. 2B is a sectional view of the capacitor element used in the capacitor in accordance with the first exemplary embodiment of the present invention.

FIG. 1 is a perspective view of a capacitor in accordance with the first exemplary embodiment of the present invention. FIG. 2A is a plan view of a capacitor element used in the capacitor in accordance with the first exemplary embodiment of the present invention, and FIG. 2B is a sectional view of the capacitor element. FIG. 2B shows a shape of a cross section taken along line 2B-2B in FIG. 2A.

As shown in FIG. 1, capacitor 2 is configured by laminating a plurality of capacitor elements 1 each having a plate shape.

Furthermore, as shown in FIG. 2A, capacitor element 1 includes anode layer 5, cathode layer 7, and resist portion 6 (electrical insulator) for separating between anode layer 5 and cathode layer 7.

Furthermore, as shown in FIG. 2B, capacitor element 1 includes electrode foil 4. On the surface of electrode foil 4, oxide film 3 is formed.

Resist portion 6 is provided such that electrode foil 4 is pressed after oxide film 3 is formed on the surface of electrode foil 4. Resist portion 6 divides electrode foil 4 into anode layer 5 and a cathode formation part including cathode layer 7.

Cathode layer 7 is formed on oxide film 3 of the cathode formation part. Cathode layer 7 includes solid electrolyte layer 8 made of a conductive polymer formed on oxide film 3, and cathode current collector 9 made of a carbon layer and a silver paste layer formed on solid electrolyte layer 8.

As shown in FIG. 1, anode layer 5 of each of the plurality of laminated capacitor elements 1 is connected to anode COM terminal 10 by laser welding.

Cathode COM terminal 11 is connected to cathode layers 7. Cathode COM terminal 11 is provided with bent portion 11a. Bent portion 11a is formed by upwardly bending the both side surfaces of a portion on which capacitor elements 1 are placed. The portion of cathode COM terminal 11 on which the elements are mounted and cathode layer 7 of capacitor element 1, bent portion 11*a* and cathode layer 7, as well as cathode layers 7 of capacitor elements 1 can be joined with each other with an electric conductive adhesive agent, respectively.

Anode COM terminal 10 and cathode COM terminal 11 together with a plurality of capacitor elements 1 are integrally covered with coating resin body 12 made of an insulating resin in a state in which a part of each of anode COM terminal 10 and cathode COM terminal 11 is exposed to the outer surface. The part of each of anode COM terminal 10 and cathode COM terminal 11 extending out from coating resin body 12 is bent toward the bottom surface along coating resin body 12. Thus, surface mount type capacitor 2 provided on the bottom surface with an anode terminal and a cathode terminal can be produced.

Figure 3:
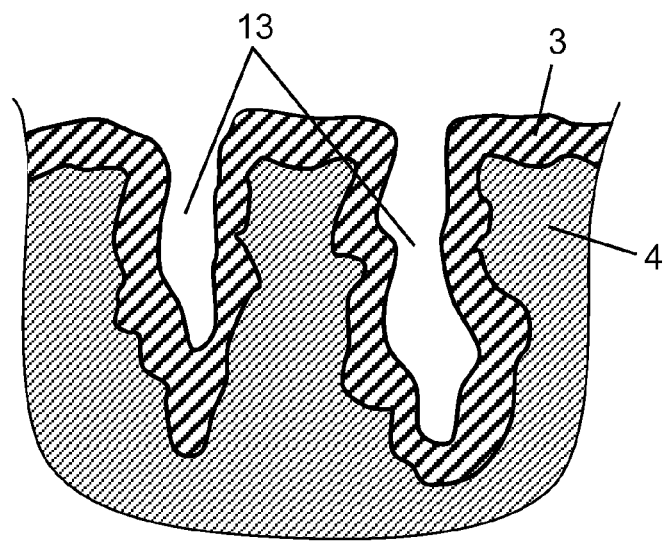
FIG. 3 is a schematic sectional view of electrode foil in accordance with the first exemplary embodiment of the present invention.

FIG. 3 is a schematic sectional view of electrode foil 4 in accordance with the first exemplary embodiment of the present invention. As shown in FIG. 3, the surface of electrode foil 4 is etched so as to form fine pits 13. In order to increase capacitance, electrode foil 4 having a thickness of 70 to 120 μm is usually etched to the depth of about 30 to 35 μm. When electrode foil 4 is etched to the depth of at least 10 μm or more, sufficient capacitance can be ensured.

In etching of electrode foil 4, as an etchant, a mixed solution obtained by mixing sulfuric acid as additives into an acidic aqueous solution having a chlorine ion concentration of 2.75 N so that the sulfuric acid concentration is 0.1% is used. In the etching, a plain (non-etched) state electrode foil 4 is impregnated with the etchant.

An etching process is carried out by setting one carbon electrode each on both sides of electrode foil 4, and applying an alternating current to the two carbon electrodes. At this time, an AC power supply condition is adjusted so that etching reduction amount per unit area of electrode foil 4 is 10 mg/cm$^2$. After that, dechlorination and drying are carried out so as to produce etched electrode foil 4.

As shown in FIG. 3, on etched electrode foil 4, oxide film 3 is formed along the shape of fine pits 13 formed on the surface of electrode foil 4. Oxide film 3 is formed by anodizing electrode foil 4. The film thickness of oxide film 3 in this exemplary embodiment is about 0.01 μm.

In anodization of electrode foil 4, etched electrode foil 4 is anodized under conditions of an anodization voltage of 4.5 V, and a retention time of 20 minutes, with 0.3% ammonium phosphate aqueous solution at 70° C. at 0.05 A/cm$^2$. The capacitance of the electrode foil is measured under conditions in which 8% ammonium pentaborate aqueous solution is used, the measurement temperature is 30° C., the measurement area is 10 cm$^2$, the measurement frequency is 120 Hz, and an impedance analyzer or an LCR meter are used.

Electrode foil 4 of this exemplary embodiment is made of an aluminum-zirconium alloy containing aluminum as a main component. The atomic ratio of zirconium in electrode foil 4 is about 0.03 atomic percent (at %) or more and 0.5 at % or less, and the atomic ratio of aluminum is about 99 at % or more.

Electrode foil 4 includes inevitable impurities, including 64 ppm of silicon, 18 ppm of iron, 4 ppm of copper, nickel, and the like, in mass fraction, and other compositions in the mass fraction or less. These impurities are smaller than zirconium in terms of the mass fraction and the atomic ratio. That is to say, in the atomic ratio of electrode foil 4 in this exemplary embodiment, zirconium is the second largest to aluminum.

Electrode foil 4 includes a plurality of intermetallic compounds any of which has a diameter of 1 μm or less. The composition of the intermetallic compound is Al$_3$Zr.

Figure 4:
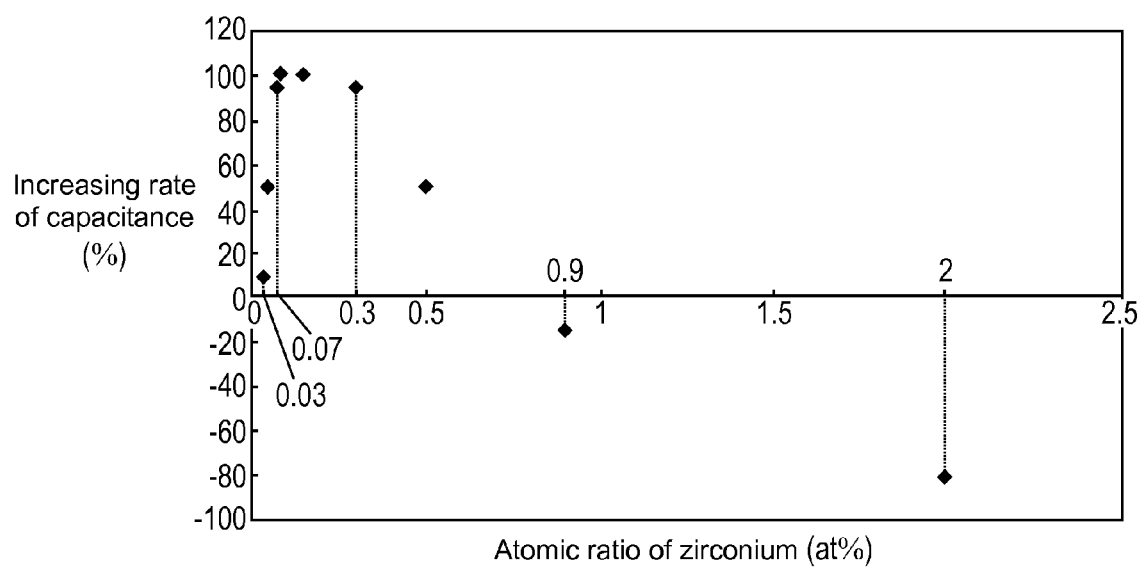
FIG. 4 is a graph showing a relation between an atomic ratio of zirconium and an increasing rate of capacitance in the electrode foil in accordance with the first exemplary embodiment of the present invention.

FIG. 4 is a graph showing an increasing rate of capacitance of electrode foil 4 in this exemplary embodiment in comparison with that of conventional electrode foil using aluminum foil. In the electrode foil made of aluminum foil as the comparative example, an atomic ratio of zirconium is less than 0.01 at % and an atomic ratio of aluminum is 99.9 at % or more. Both electrode foil 4 of this exemplary embodiment and the electrode foil of the comparative example are subjected to anodization after etching as mentioned above.

FIG. 4 shows an increasing rate (%) of capacitance in the axis of ordinate, and shows that a reference value (0%) is the same value as the capacitance of the comparative example. Furthermore, the axis of abscissa of FIG. 4 shows the atomic ratio (at %) of zirconium in electrode foil 4. Note here that an actually measured value of the capacitance in the reference value (0%) is about 700 μF when electrode foil having a size of 1 cm×2 cm is used.

As is apparent from the results of FIG. 4, when the atomic ratio of zirconium is in the range of 0.07 at % or more and 0.3 at % or less, the capacitance is increased by substantially 100% as compared with the comparative example and the increasing rate is a peak.

Also when the atomic ratio of zirconium is 0.03 at % or more and less than 0.07 at %, and more than 0.3 at % and 0.5 at % or less, the capacitance of electrode foil 4 is increased as compared with the comparative example.

Furthermore, as a result of analysis by SEM photography, when the atomic ratio of zirconium is in the range of 0.3 at % or less, intermetallic compounds hardly precipitate, and slightly precipitating intermetallic compounds are very small and have a diameter of 1 μm or less.

However, when the atomic ratio of zirconium is more than 0.5 at %, large intermetallic compounds having a diameter of 20 μm or more precipitate, and the diameter and the number thereof are increased as the atomic ratio increases. The intermetallic compounds are not etched and remain on the surface of electrode foil 4, which remarkably reduces the capacitance. For example, in FIG. 4, when the atomic ratio of zirconium is 0.9%, a large number of intermetallic compounds start to precipitate, and the capacitance is lowered as compared with the conventional example. When the atomic ratio of zirconium is 2%, the capacitance is lowered by as large as 80% as compared with the conventional example.

When zirconium is in the range of 0.3 at % or more and 0.5 at % or less, intermetallic compounds having a diameter of larger than 1 μm also precipitate, but the size of the intermetallic compound is relatively smaller and the number thereof is smaller as compared with the case where the atomic ratio is more than 0.5 at %.

As mentioned above, in capacitor element 1 in this exemplary embodiment, the capacitance of electrode foil 4 can be increased. This is because the precipitation of the intermetallic compounds can be suppressed by reducing the content of zirconium as mentioned above. Therefore, according to this exemplary embodiment, electrode foil 4 can be finely etched, and the surface area can be enlarged and the capacitance can be increased.

Furthermore, in this exemplary embodiment, even though the content of zirconium is reduced to the above-mentioned range, the dielectric constant of oxide film 3 can be remarkably increased, and the capacitance can be increased.

According to the study, it is thought to be because the dielectric constant is increased largely due to the dielectric constant derived from oxides other than an oxide of zirconium ($ZrO_2$). That is to say, it is thought that a part of aluminum in a crystal lattice of alumina (oxide film 3) is easily subjected with zirconium during anodization, for example, because of the atomic size of zirconium, and because properties with respect to pH and electric potential are similar in zirconium and aluminum. Thus, it is assumed that the crystalline structure in the vicinity of zirconium is changed and a crystal lattice including $Al_{2-x}Zr_xO_{3+y}$ is formed, resulting in that the dielectric constant is remarkably increased.

In this exemplary embodiment, electrode foil 4 is etched. It is preferable that etched electrode foil 4 has a composition including an aluminum alloy containing aluminum as a main component and zirconium of at least 0.03 at % and at most 0.5 at %. Furthermore, since electrode foil 4 in the depth of at least 10 μm is etched, it is preferable that electrode foil 4, even in a state before it is etched, is made of an aluminum alloy containing aluminum as a main component and zirconium of at least 0.03 at % and at most 0.5 at % in the region at least 10 μm deep from the surface of the foil.

As mentioned above, according to the present invention, the surface area can be enlarged by etching, and oxide film 3 having high dielectric constant can be formed. Thus, as a result, by using foil made of the aluminum-zirconium alloy, the capacitance of electrode foil 4 can be remarkably improved.

Note here that electrode foil 4 can have a reduced LC (Leak Current) value when heat treatment is carried out before etching.

Figure 5:
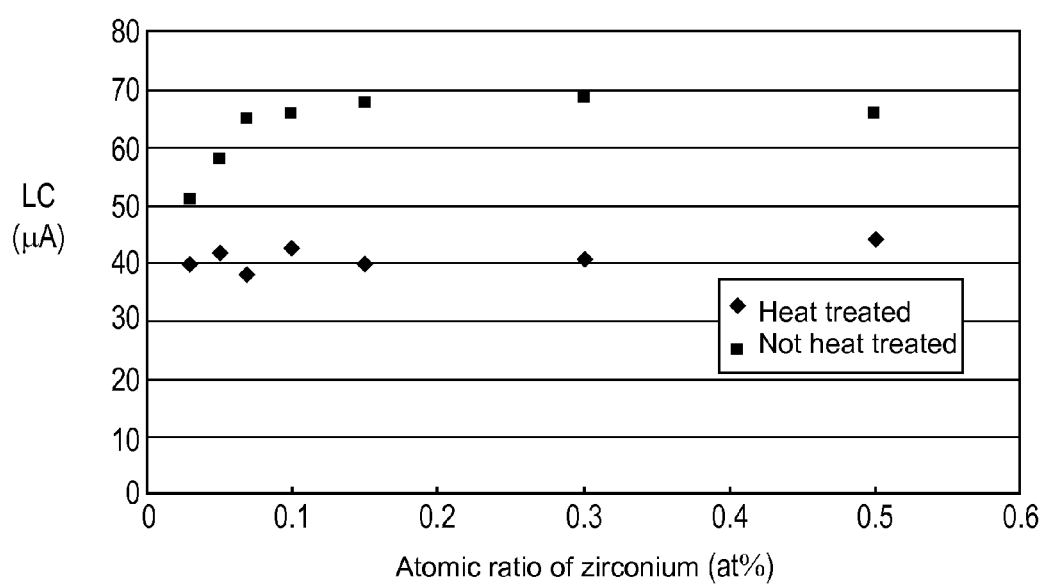
FIG. 5 is a graph showing a relation between presence or absence of heat treatment and a leak current in the electrode foil in accordance with the first exemplary embodiment of the present invention.

FIG. 5 is a graph showing measurement results of the LC values in electrode foil 4 that has not been subjected to heat treatment and electrode foil 4 that has been subjected to heat treatment in an nitrogen atmosphere at 350° C. for 8 hours, followed by carrying out an etching process and an anodizing process, respectively. In both cases, the ratio of zirconium in electrode foil 4 is in the range from 0.03 to 0.5 at %.

The LC value is measured in 15% diammonium adipate aqueous solution at 30° C. by using electrode foil 4 having a shape of 1 cm×2 cm in each sample. The LC value is a value of electric current when stainless steel foil having a sufficiently large area is used for a cathode, each sample is used for an anode, and a DC voltage of 3.5 V is applied for two minutes.

As a result, as shown in FIG. 5, when zirconium is in the range from 0.03 to 0.5 at %, a leak current can be reduced by 10 μA or more in electrode foil 4 that has been subjected to heat treatment as compared with a case where heat treatment has not been carried out.

Furthermore, also in the case where the heat treatment is carried out for 2 hours or 20 hours, in electrode foil 4 that has been subjected to heat treatment, a leak current can be reduced similar to the example mentioned above. Also in the case where the heat treatment temperature is 250° C. or 450° C. and heat treatment time is 8 hours, in electrode foil 4 that has been subjected to heat treatment, a leak current can be reduced as in the example mentioned above.

Second Exemplary Embodiment

Figure 6:
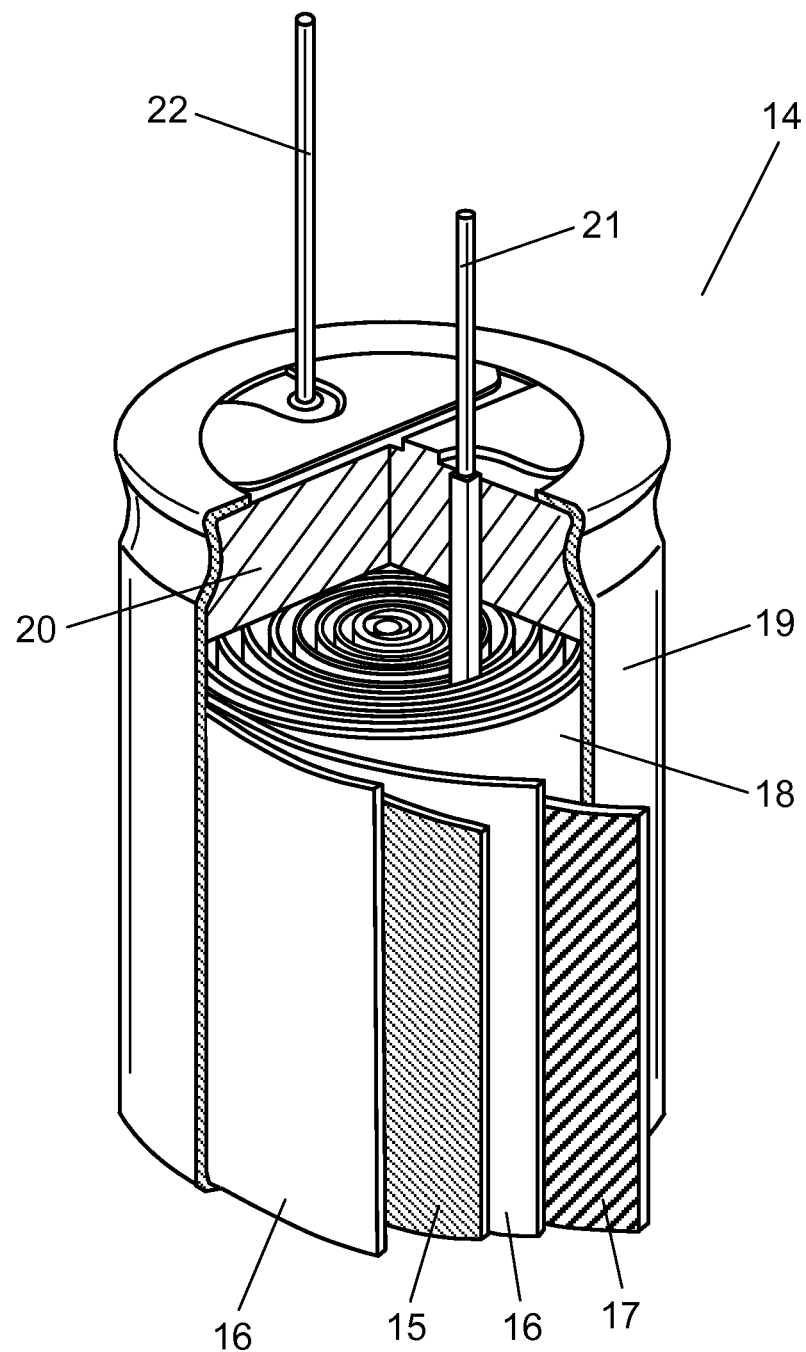
FIG. 6 is a partially cut-away perspective view of a capacitor in accordance with a second exemplary embodiment of the present invention.

In a second exemplary embodiment, electrode foil 4 that is similar to that described in the first exemplary embodiment is used in an aluminum electrolytic capacitor (capacitor 14) using a liquid electrolytic solution as an electrolyte is described. FIG. 6 is a partially cut-away perspective view of capacitor 14 in accordance with the second exemplary embodiment of the present invention.

Capacitor 14 of this exemplary embodiment includes, as shown in FIG. 6, capacitor element 18 formed by winding first electrode foil 15 as an anode layer, an oxide film (not shown) formed on first electrode foil 15, and second electrode foil 17 facing the oxide film via separator 16.

Capacitor 14 further includes a driving electrolytic solution with which separator 16 is impregnated, and case 19 for accommodating the driving electrolytic solution and capacitor element 18. Case 19 is sealed with sealing rubber 20. Furthermore, to first electrode foil 15 and second electrode foil 17, lead terminals 21 and 22 are connected, respectively. Lead terminals 21 and 22 penetrate sealing rubber 20 and extend to the outside.

In this exemplary embodiment, first electrode foil 15 is made of aluminum-zirconium alloy foil whose surface is etched similar to that of electrode foil 4 described in the first exemplary embodiment. First electrode foil 15 contains aluminum as a main component in the atomic ratio of about 99 at % or more and zirconium in the atomic ratio of at least 0.03 at % and at most 0.5 at %.

It is preferable that first electrode foil 15, even in a state in which the surface thereof is not etched, includes zirconium of at least 0.03 at % and at most 0.5 at % in a region at least 10 μm deep from the surface of the foil. This is because the region at least 10 μm deep from the surface is etched by an etching process. In addition, in first electrode foil 15, as in the first exemplary embodiment, an oxide film (not shown) is formed on the surface thereof by carrying out anodization after etching processing.

Also in this exemplary embodiment, when a small amount of zirconium atoms are allowed to be contained, a crystal lattice structure in the oxide film of first electrode foil 15 is changed, thereby enabling the dielectric constant of the oxide film to be enhanced. Thus, capacitance of first electrode foil 15 can be remarkably enhanced. Furthermore, by suppressing the atomic ratio of zirconium atoms, fine processing by etching can be carried out, and the surface area can be enlarged and the capacitance can be increased.

Also in this exemplary embodiment, in order to increase the capacitance, the atomic ratio of zirconium atoms in first electrode foil 15 is preferably at least 0.03 at % and at most 0.5 at %. The increasing rate of capacitance becomes peak when the atomic ratio is at least 0.07 at % and at most 0.3 at %.

The first and second exemplary embodiments of the present invention describe examples in which electrode foil 4 and first electrode foil 15 are subjected to etching processing, but electrode foil 4 and first electrode foil 15 may be used in a plain state in which they are not etched. Also in this case, by allowing a small amount of zirconium atoms to be contained, a crystal lattice structure of the oxide film can be changed, so that the dielectric constant can be enhanced to thus enhance the capacitance.

Furthermore, the first and second exemplary embodiments describe an example of a solid electrolytic capacitor or a winding type aluminum electrolytic capacitor using a conductive polymer as an electrolyte, but the present invention is not limited to these examples. For example, an organic semiconductor may be used as an electrolyte for solid electrolytic capacitors, and the aluminum electrolytic capacitor may be a laminated type. Furthermore, an electrolyte in which a solid electrolyte and an electrolytic solution are combined may be used.

As mentioned above, since electrode foil of the present invention has high capacitance, it can be used for electrolytic capacitors having a small size and large capacity.

The invention claimed is:

1. Electrode foil comprising an aluminum alloy having a composition in a region at least 10 μm deep from a surface of the foil, the composition including aluminum as a main component and zirconium of at least 0.03 atomic percent (at %) and at most 0.5 at %, wherein pits are formed in said region.

2. The electrode foil of claim 1, wherein the electrode foil is formed of an aluminum alloy in a whole range, and the aluminum alloy including aluminum as a main component and zirconium of at least 0.03 at % and at most 0.5 at %.

3. The electrode foil of claim 1,
wherein in an atomic ratio of components contained, zirconium is second largest to aluminum.

4. The electrode foil of claim 1, comprising an intermetallic compound including $Al_3Zr$,
wherein the intermetallic compound has a diameter of 1 μm or less.

5. A capacitor comprising a capacitor element including:
electrode foil of claim 1;
an oxide film formed on a surface of the electrode foil; and
a cathode layer including a solid electrolyte layer and a cathode current collector, and formed on the oxide film.

6. The capacitor of claim 5,
wherein the electrode foil is formed of an aluminum alloy in a whole range of the foil, and the aluminum alloy including aluminum as a main component and zirconium of at least 0.03 at % and at most 0.5 at %.

7. A capacitor comprising:
a capacitor element including
electrode foil of claim 1,
an oxide film formed on the electrode foil, and
second electrode foil facing the oxide film via a separator;
a driving electrolytic solution with which the separator is impregnated; and
a case for accommodating the driving electrolytic solution and the capacitor element.

8. The capacitor of claim 7,
wherein the electrode foil is formed of an aluminum alloy in a whole range of the foil, and aluminum alloy including aluminum as a main component and zirconium of at least 0.03 at % and at most 0.5 at %.

9. Electrode foil comprising an aluminum alloy having a composition in a region at least 10 μm deep from a surface of the foil, the composition including aluminum as a main component and zirconium of at least 0.03 atomic percent (at %) and at most 0.5 at %; and
an intermetallic compound including $Al_3Zr$,
wherein the intermetallic compound has a diameter of 1 μm or less.

10. A capacitor comprising a capacitor element including:
electrode foil;
an oxide film formed on a surface of the electrode foil; and
a cathode layer including a solid electrolyte layer and a cathode current collector, and formed on the oxide film,
wherein the electrode foil comprises an aluminum alloy having a composition in a region at least 10 μm deep from a surface of the foil, the composition including aluminum as a main component and zirconium of at least 0.03 atomic percent (at %) and at most 0.5 at %.

11. The capacitor of claim 10,
wherein the electrode foil is formed of an aluminum alloy in a whole range of the foil, and the aluminum alloy including aluminum as a main component and zirconium of at least 0.03 at % and at most 0.5 at %, and the surface is etched.

12. A capacitor comprising:
a capacitor element including
electrode foil,
an oxide film formed on the electrode foil, and
second electrode foil facing the oxide film via a separator;
a driving electrolytic solution with which the separator is impregnated; and
a case for accommodating the driving electrolytic solution and the capacitor element,
wherein the electrode foil comprises an aluminum alloy having a composition in a region at least 10 μm deep from a surface of the foil, the composition including aluminum as a main component and zirconium of at least 0.03 atomic percent (at %) and at most 0.5 at %.

13. The capacitor of claim 12,
wherein the electrode foil is formed of an aluminum alloy in a whole range of the foil, and aluminum alloy including aluminum as a main component and zirconium of at least 0.03 at % and at most 0.5 at %, and wherein the surface is etched.

* * * * *